Oct. 15, 1974     J. B. BLACK     3,841,949

COMPOSITE FRICTION PLATE

Filed Oct. 25, 1972

United States Patent Office 3,841,949
Patented Oct. 15, 1974

3,841,949
COMPOSITE FRICTION PLATE
James W. Black, Roscoe, Ill., assignor to Twin Disc, Incorporated, Racine, Wis.
Filed Oct. 25, 1972, Ser. No. 300,501
Int. Cl. B32b 5/16, 25/02; F16d 13/60, 69/00
U.S. Cl. 161—42                                5 Claims

ABSTRACT OF THE DISCLOSURE

An improved friction plate for use in lieu of conventionally faced friction plates is provided with a facing of synthetic rubber presenting small lands in which friction material, such as sintered powdered bronze, is embedded to form the actual friction surface.

BACKGROUND OF THE INVENTION

The invention relates to friction plates such as are commonly used in multiple disc clutches and disc brakes.

A shortcoming of friction plates as heretofore used in multiple disc clutches and brakes is the fact that due to the rigidity of the materials, only a very small portion of the clutch plate surface is used at any instant. Proof of this is that when using a copper base friction material, incipient failure is noted by transfer of material from the friction face to the mating steel face. This will not occur uniformly over the surface but will occur in as few as three spots and over as little as one percent of the area.

The cause of this is the physical inability to produce absolutely flat surfaces and the high rigidity of the materials being used, not allowing the surfaces to conform. The modulus of the elasticity for steel is thirty million, while that of the friction material is probably between ten and fifteen million. A typical calculation will indicate that with quite extreme unit loadings, the deformation of the friction material in compression will be only a few millionths of an inch.

SUMMARY OF THE INVENTION

The principal object of the present invention is to provide an improved clutch plate or the like whose friction facing will be considerably more conformable with a companion plate than has heretofore been possible with conventionally faced friction plates.

With this object in mind, the invention contemplates the use of a material, such as synthetic rubber which is highly heat resistant but whose modulus of elasticity is much lower than that of steel. Such material will therefore provide the necessary degree of conformability which will insure that a majority of the clutch surface can be used at all times.

The invention further contemplates to embed small individual pellets of sintered metal, such as bronze, in the low elasticity modulus, flexible material. In that manner, the flexible material, rather than the metallic friction material will do the flexing, and fatigue failure which may otherwise be incurred will be avoided.

Another object of the invention is to reduce the requirements for the quantity of cooling oil for the dissipation of a given amount of heat in the clutch or brake. With oil cooled clutch or brake discs, as heretofore used, enough oil had to be supplied at the specific area where the heat was developed, to provide the necessary cooling. At the same time, the oil had to be supplied to all areas since it was not known specifically where the heat was being generated, resulting in very inefficient use of the oil supplied. With the heat being generated more nearly uniform over the entire surface, in accordance with the present invention, the efficiency of the use of the oil will be improved, allowing either more energy to be dissipated in the clutch or brake, or the oil flow to be reduced.

These and other objects and advantages of the present invention will appear hereinafter as this disclosure progresses, reference being had to the accompanying drawings.

Description of a Preferred Embodiment

Figure 1:
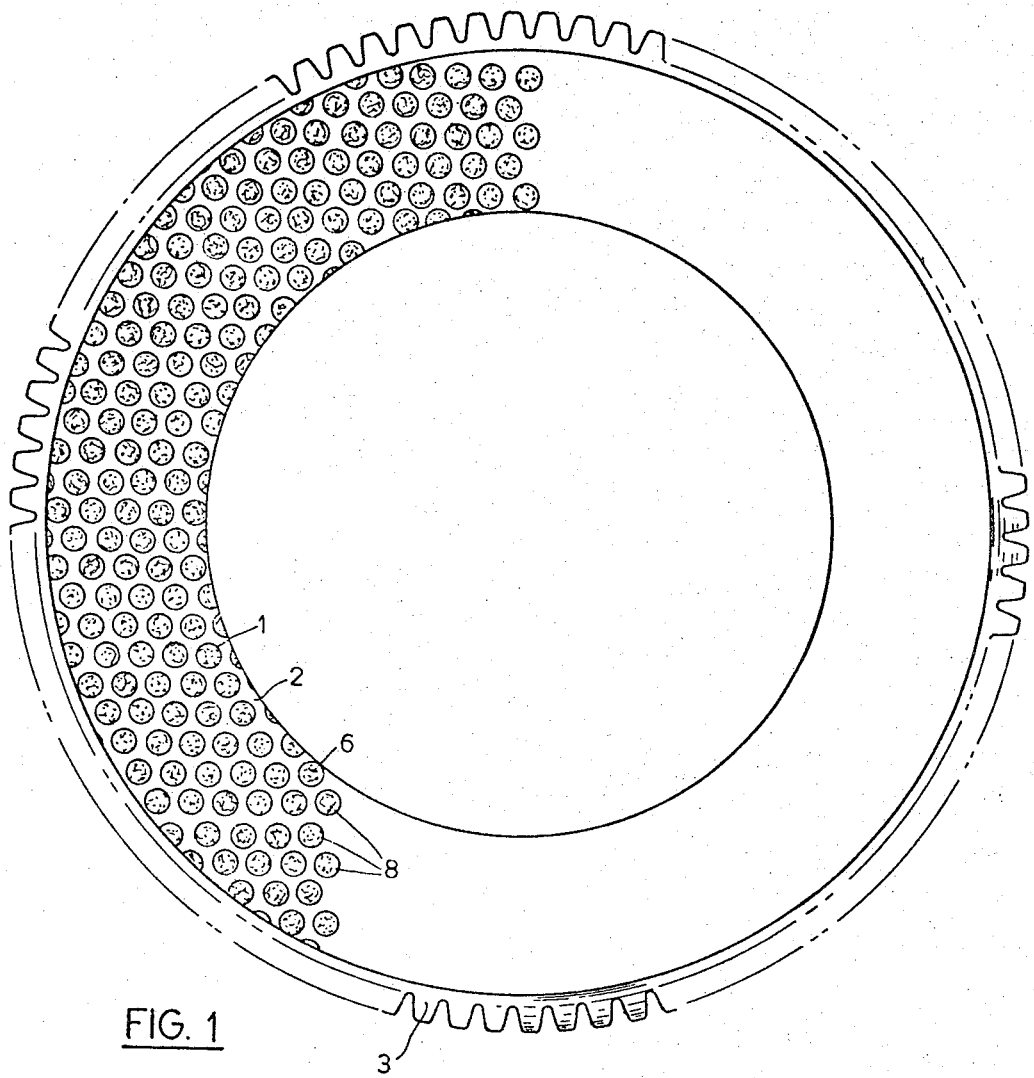
FIG. 1 is a plan view of a clutch plate embodying the invention.

The clutch plate shown in FIG. 1 is in the form of a five layer sandwich whose first layer 1 consists of friction material; whose second layer 2 consists of low compression modulus material; whose third layer 3 consists of a high strength core; whose fourth layer 4 consists of low compression modulus material; and whose fifth layer 5 consists of friction material. The first layer 1 is embedded in the second layer 2; the second layer 2 is bonded to one side of the third layer 3, the fourth layer is bonded to the other side of the third layer 3, and the fifth layer 5 is embedded in the fourth layer 4.

The third layer 3 is made of high strength metal, preferably steel and forms a core having plane parallel outer surfaces at its opposite sides. Each of the second and fourth layers is formed by a flat coating of heat resistant synthetic rubber which has a modulus of elasticity less than said core, the second layer being bonded to one side and the fourth layer being bonded to the other side of the core 3. The layer 2 presents a plane outer surface parallel to the plane surface of the core 3 to which it is bonded, and the layer 4 presents a plane outer surface parallel to the plane surface of the core 3 to which it is bonded.

The first layer 1 which affords the friction surface at one side of the core 3 consists of a large number of discrete metal particles 6, such as sintered bronze powder, which are embedded in the coating flush with its outer surface, and form a layer of less thickness than that of the coating.

The fifth layer 5 which affords the friction surface at the other side of the core 3 likewise consists of a large number of discrete metal particles 7 which are embedded in the coating 4 flush with its outer surface and form a layer of less thickness than that of the coating.

The coatings 2 and 4 at the opposite sides of the core 3 are quite thin as compared with the thickness of the core 3. Also, each of the coatings 2 and 4 are recessed so as to present the metal particles 6 in projections or lands, generally designated by the reference numeral 8 in FIG. 1. Preferably the lands are in the shape of circular buttons, which project from a thin base of the coating and are distributed over the base in spaced relation to each other. To provide for adequate circulation of cooling oil between the lands the recessed area of each of the second and fourth layers is preferably between 20 percent and 60 percent of the total surface area of the layer.

Figure 2:
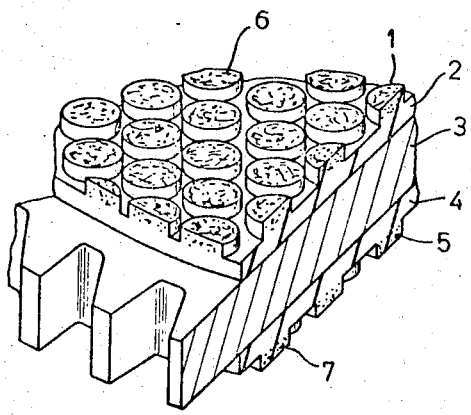
FIG. 2 is an enlarged, perspective view of a portion of the clutch plate shown in FIG. 1.
Figure 3:
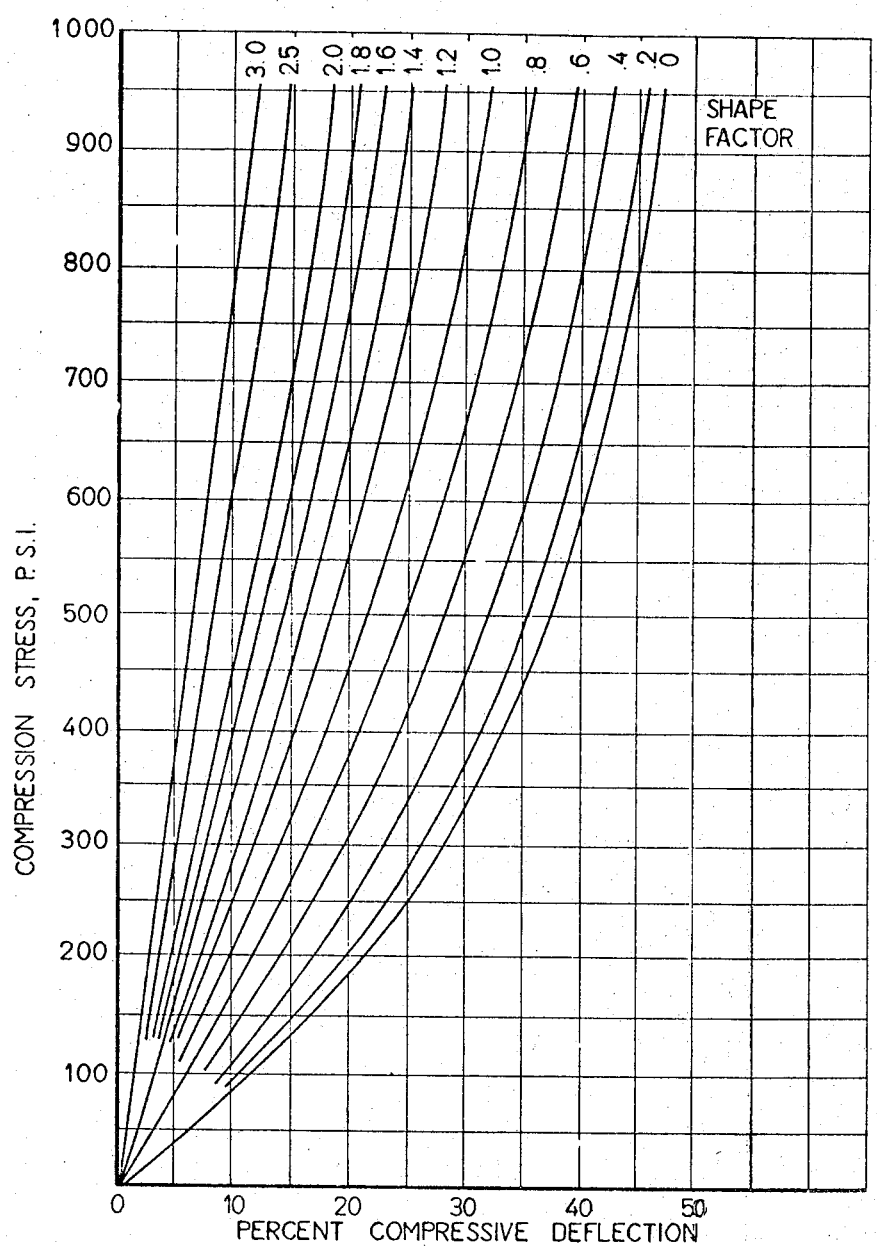
FIG. 3 is a chart illustrating the relationship between Compression Stresses and Percent Compressive Deflection for various Shape Factors of low elasticity modulus material as contemplated for use by the present invention.

Also, in order to provide for the desired extent of conformability of the friction plate with a companion plate, the shape factor of the lands should be between one and five. Shape factor is defined as the area of one loaded surface divided by the free area. In the case of circular lands, as shown in FIG. 2, the shape factor of the lands would be their circular surface area divided by their peripheral surface area. From the chart shown in FIG. 3, it will be seen that with a shape factor of say 2.5 a compressive deflection of five percent would be available for practical use, that is, with a compression load of about 150 p.s.i. on a plate coating of synthetic rubber having a suitably low modulus of elasticity. Assuming such plate coating to have a thickness of .03 inches, the result would be a deflection of up to .0015 inches which would make the herein disclosed clutch plate up to 500 times as conformable as a conventional sintered metal clutch plate. Accordingly, a clutch plate embodying the invention will be capable of utilizing substantially its entire friction surface for cooperative engagement with its companion plate at all times.

What is claimed is:

1. A friction plate comprising a flat steel core having plane, parallel outer surfaces at its opposite sides; a flat coating of heat resistant synthetic rubber bonded to each of said outer surfaces of said core, said coatings presenting plane outer surfaces, respectively, parallel to said outer surfaces of said core; and two layers of sintered metal particles, one layer embedded in one of said coatings flush with said outer surface thereof and being of less thickness than said one coating; and the other layer embedded in the other of said coatings flush with said outer surface thereof and being of less thickness than said other coating.

2. A friction plate as set forth in Claim 1, wherein the thickness of each of said coatings is substantially less than the thickness of said core.

3. A friction plate as set forth in Claim 2, wherein each of said coatings comprises a continuous thin base and a plurality of relatively spaced projections rising from and distributed over said base.

4. A friction plate comprising a high strength metallic core; coatings of heat resistant synthetic rubber bonded, respectively, to opposite sides of said core and each having a modulus of elasticity substantially less than said core; and layers of small individual particles of sintered powdered metal embedded, respectively, in said coatings flush with the outer surfaces thereof, the thickness of each of said coatings being greater than the thickness of the particle layer embedded therein.

5. A friction plate as set forth in Claim 4, wherein each of said coatings comprises a continuous thin base and a plurality of relatively spaced lands projecting from and distributed over said base, said particle layers being embedded in said lands flush with the outer surfaces thereof.

References Cited

UNITED STATES PATENTS

| | | | |
|---|---|---|---|
| 3,390,750 | 7/1968 | Albertson | 192—107 M |
| 3,698,526 | 10/1972 | Berges | 192—107 M |
| 2,191,460 | 2/1940 | Fisher | 192—107 M |
| 2,072,070 | 2/1937 | Fisher | 192—107 M |
| 2,464,437 | 3/1949 | Dasher | 188—251 M |
| 2,966,737 | 1/1961 | Spokes et al. | 192—107 M |

PHILIP DIER, Primary Examiner

U.S. Cl. X.R.

161—116, 165, 174; 188—251; 192—107